United States Patent [19]

Delaney

[11] 3,912,633

[45] Oct. 14, 1975

[54] OIL FILTER WITH PULL TAB DRAIN

[76] Inventor: Arthur Delaney, 521 W. 73rd St., Downers Grove, Ill. 60515

[22] Filed: Sept. 9, 1974

[21] Appl. No.: 504,524

[52] U.S. Cl. .......... 210/168; 210/DIG. 17; 210/233; 210/238; 210/443
[51] Int. Cl.² .................................... F01M 11/04
[58] Field of Search .......... 210/232, 233, 235, 240, 210/DIG. 17, 436, 442, 443, 444, 282, 168; 220/268, 269; 113/121; 29/509

[56] References Cited
UNITED STATES PATENTS

| | | | |
|---|---|---|---|
| 1,731,209 | 10/1929 | Champion | 210/DIG. 17 |
| 2,639,036 | 5/1953 | Humber et al. | 210/233 |
| 3,216,609 | 11/1965 | Bogert | 220/269 |
| 3,250,242 | 5/1966 | Pekarek | 210/DIG. 17 |
| 3,338,461 | 8/1967 | Cookson | 220/269 |
| 3,380,593 | 4/1968 | Uhen et al. | 210/444 X |
| 3,388,802 | 6/1968 | Wilkinson | 210/443 |
| 3,404,800 | 10/1968 | Arfert | 220/269 |
| 3,481,478 | 12/1969 | Williams | 210/443 X |
| 3,490,597 | 1/1970 | Casaleggi | 210/443 |

*Primary Examiner*—Theodore A. Granger
*Attorney, Agent, or Firm*—Merriam, Marshall, Shapiro & Klose

[57] ABSTRACT

An oil filter for use with an internal combustion engine or other type of power source and including a tear strip integrally formed therein with an attached tab or ring which may be grasped and pulled to tear the strip from the oil filter thus allowing the oil contained therein to be selectively drained prior to removal of the oil filter. The tear strip may be located on the side or may be located on the dome or top portion of the oil filter.

6 Claims, 14 Drawing Figures

OIL FILTER WITH PULL TAB DRAIN

BACKGROUND OF THE INVENTION

1. Field of the Invention

This invention pertains to a fluid filtering device for removing foreign contaminates from a lubricant, such as oil, and the filter has a removable tear strip attached in such a manner to permit selective draining of stored oil prior to replacement of the filter.

2. Description of the Prior Art

Prior art cartridge type oil filters all generally provide a metallic oil filter housing which is screwed onto an engine block, or a mounting bracket adjacent an engine block, and which, during removal, always results in oil contained within the oil filter spilling over from the bottom of the filter and dripping on the person changing the filter and oftentimes spotting or discoloring the floor of the adajcent work area. This problem is particularly magnified whenever an oil filter is to be replaced immediately after a car has been driven and there is residual oil pressure within the oil lines thereby urging the heated, thinned oil from the oil filter rapidly, and in a splashing manner, upon initial loosening of the oil filter.

Prior art filters such as disclosed in U.S. Pat. No. 3,502,218 (1970) show a drainage plug which permits removal of filtered water from the filter. Such arrangements are expensive and not commercially attractive for widespread use and do not have immediate application because such filters are directed to removing contaminates from the filter and not to removing the filtered fluid from the filter.

The present invention is directed to eliminating the problems resulting from oil spilling as the filter is being replaced by providing a removable tear strip on each oil filter thereby allowing the oil to be selectively drained prior to removal of the filter. By providing such a tear strip opening, the residual oil may be removed from the filter in a manner which eliminates spilling of any oil.

SUMMARY OF THE INVENTION

This invention is directed to an improved filtering device for use with an internal combustion engine as an oil filter and which includes a tear strip for permitting selective or separate removal of oil stored within the filter prior to replacement of the filter.

The side or top of the filter housing may include a weakened line portion or scoring defining a tear strip having an outline of the desired opening. In conjunction with the tear strip, a pull tab is attached thereto by a suitable mechanical means such as a fastener or integral or separate rivet, or by a metallurgical bonding process such as soldering or welding. By simply pulling on the tab to remove the attached tear strip, the filter may be drained through a small opening without spilling, thus preventing soiling of adjacent work areas or dripping on to the mechanic who is replacing the filter.

In engines having the filter disposed in a horizontal or diagonal downward manner, the filter may be rotated as much as one half turn to align the tear strip with a container for receiving oil from the filter. This rotation of the filter will produce some decompression of the filter gasket yet the fluid tight seal will be retained. The tear strip may be easily removed by using one hand, thus permitting as hand held receptacle to be aligned with the drain opening to receive drained oil. Such a container may be relatively small and easily held because less than one quart of oil is generally present in the filter.

It is an object of the present invention to provide a filtering device which may be selectively drained of fluid contained therein.

Another object of the present invention is to provide a filtering device having a removable tear strip attached thereto at a point which will permit drainage of fluid from the filter.

Another object of the present invention is to provide an oil filter having a scored portion or tear strip and attached pull tab attached thereto thus providing a lever whereby manual lifting of the pull tab produces a multiplied lifting force which tears the material along the line of the scored portion thereby providing an opening for drainage of fluid.

Still another object of this invention is to provide a tear strip having a puncturing means associated therewith to initially pierce the filter adjacent the tear strip to facilitate initial removal of the tear strip from the filter.

These and other objects of the invention will become apparent with reference to the attached specification and appended claims.

DESCRIPTION OF THE INVENTION

Figure 1:
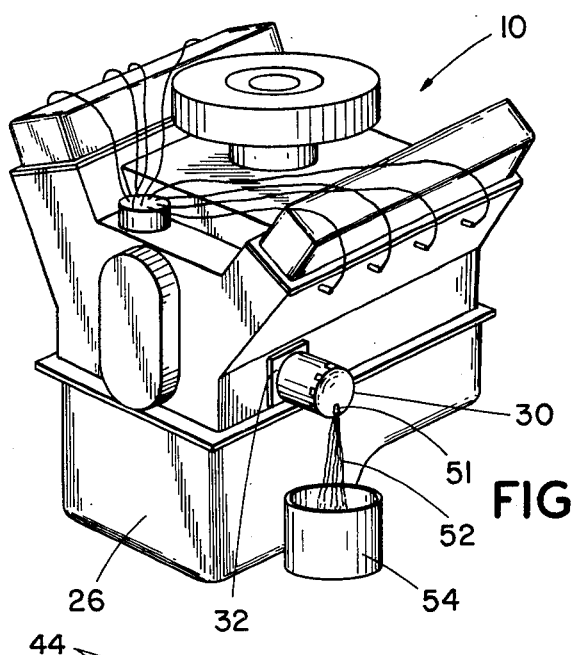
FIG. 1 is an isometric view of an internal combustion engine with the oil filter of this invention attached thereto.
Figure 2:
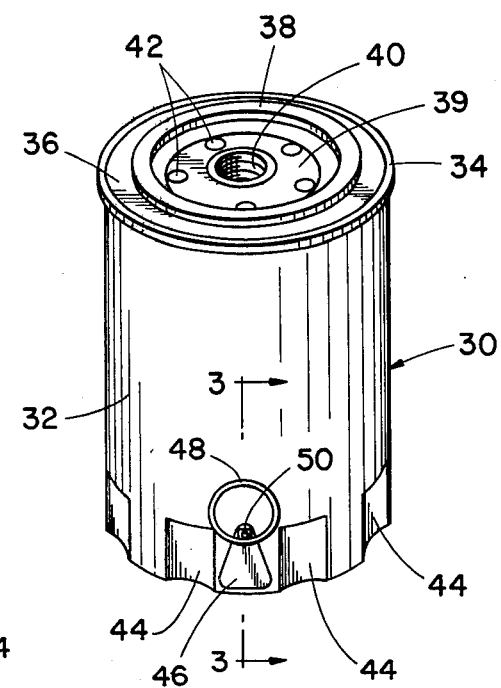
FIG. 2 is a pictorial view of one embodiment of the oil filter of this invention.

Referring now to the drawings and in particular to FIG. 1, there is illustrated there a pictorial of an internal combustion engine 10. Although the drawings are made with reference to a V-8 engine of the spark ignition variety, namely, the type used in automobiles, this invention is not limited to automobile, V-8 spark ignition engines, but may be used on 6 cylinder engines, diesel engines, Wankel type rotary engines and engines used with nonautomotive applications and other engines which now utilize replaceable oil filters. The engine 10 has a crankcase 26 which stores the major portion of engine oil; however, some oil remains in the oil filter when the engine is turned off.

Figure 6:
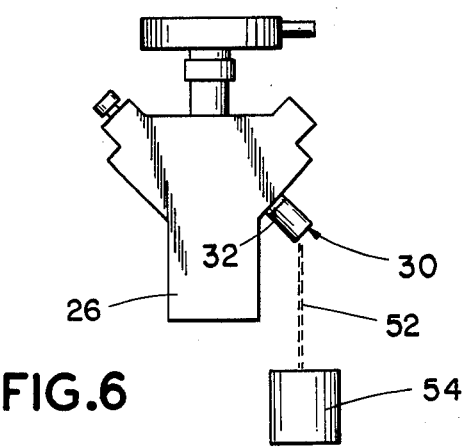
FIG. 6 is a schematic outline of an internal combustion engine using the oil filter of the present invention wherein the oil filter is attached to the engine block and extending downwardly at an oblique angle.
Figure 7:
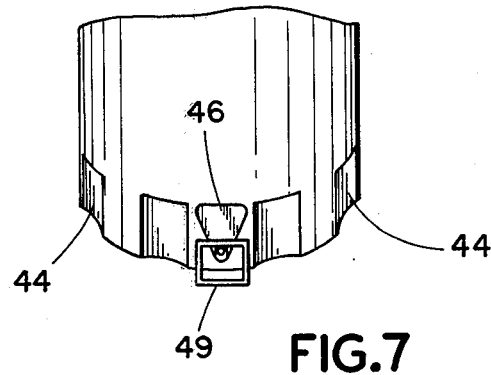
FIG. 7 is a pictorial view of a portion of an oil filter of this invention showing a generally triangular shaped tear strip on the oil filter and a square pull tab attached thereto.
Figure 9:
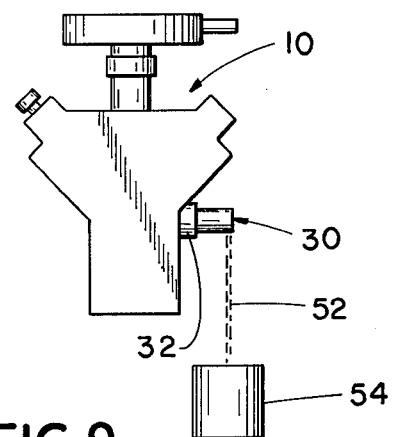
FIG. 9 is a schematic illustration of an engine block having the oil filter of the present invention attached thereto and being disposed in a horizontal position.
Figure 10:
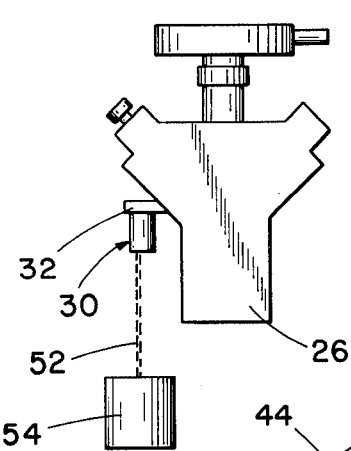
FIG. 10 is a schematic outline of an internal combustion engine with the oil filter of this invention attached thereto and extending downwardly in a generally vertical direction.
Figure 11:
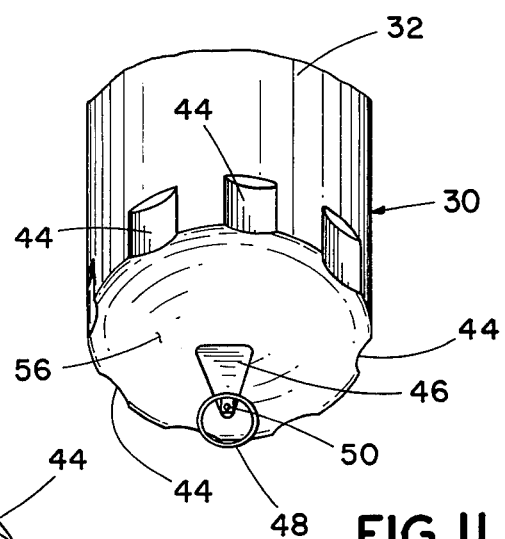
FIG. 11 is a pictorial view of a top portion of an oil filter showing a triangular shaped tear strip in the top of the oil filter.

The oil filter of this invention is designated by the numeral 30 and may be attached to an internal combustion engine in such a manner as to extend horizontally as illustrated in FIGS. 1 and 9, or to extend diagonally downwardly as illustrated in FIG. 6, or it may be attached to the engine block in such a manner as to extend vertically downwardly as is disclosed in FIG. 10. Regardless of the mounting of the oil filter 30 the associated problem inherent with removing any oil filter remains present. Namely, as the oil filter is rotated counterclockwise for removal, the residual oil build up within the filter very easily spills over the sides and can drain onto the person removing the filter, onto the adjacent floor area, or onto the engine or exhaust manifold and pipes thereby producing an irritating odor when the engine is restarted. This invention overcomes these problems by providing an oil filter with a pull tab and tear strip which may be easily removed thus allowing selective removal of oil from the filter and elimination of the contamination of dripping problems heretofore encountered.

The oil filter 30 of this invention, includes the usual cylindrical cannister body 32 and which has one end with a rim portion 34 providing for attachment of an oil filter adapter or connecting end unit 36. The rim 34 may be formed integrally with the cylindrical body 32 or it may be an independent ring member or it may be integrally formed with the end unit 36; such choice is merely a manufacturing expedient and does not form part of this invention. The connecting unit 36 of the oil filter 30 also includes a rubber gasket 38 which is resilient and which will serve to seal the oil filter onto an associated mounting plate on the engine or oil pump bracket and which will prevent leakage during operation of the engine. The end 36 also includes a connector plate 39 which may be integrally formed therewith or which may be in the form of a separate plate. Connector 39 includes a centrally disposed threaded portion 40 which permits the oil filter to be screwed onto an engine mounting plate. As mentioned, if the connector 39 is a separate part it may be joined to the oil filter bottom 36 by a plurality of spot welds 42 which will provide the required connection.

One end portion of the cannister body 32 may also include a plurality of peripherally disposed indentations 44 which aid in screwing the oil filter onto an engine block and which also aid in the oil filter manufacturing process by providing surfaces which may be easily grasped by production equipment.

Figure 3:
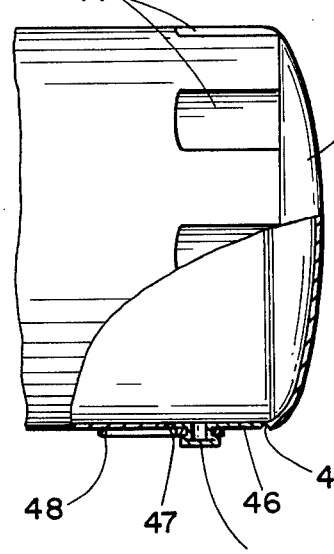
FIG. 3 is a partial side elevational view, with portions removed, of the top portion of the oil filter of this invention.
Figure 4:
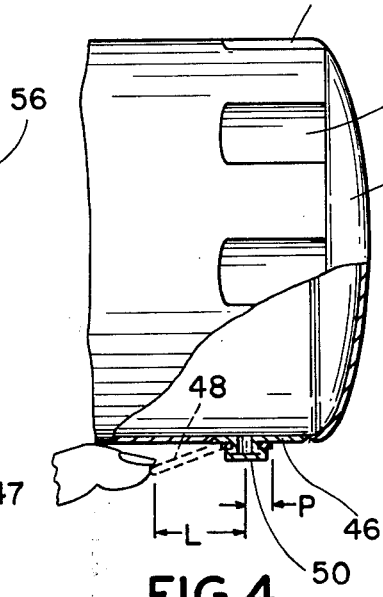
FIG. 4 is a view similar to that illustrated in FIG. 3 and showing the tear strip just prior to removal.
Figure 5:
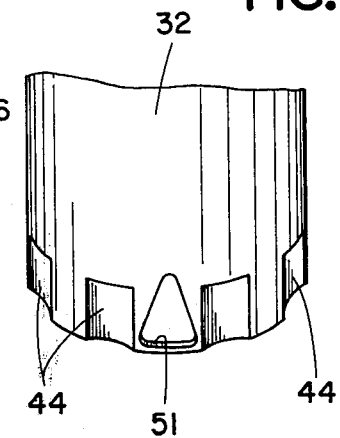
FIG. 5 is a pictorial view of the portion of the oil filter provided with an opening when the tear strip has been removed.
Figure 8:
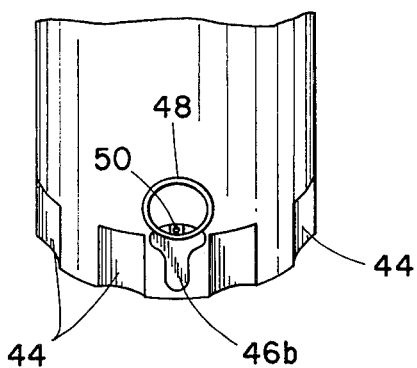
FIG. 8 is a pictorial illustration of a portion of the oil filter of this invention showing a bell shaped tear strip and an associated tab attached to one portion thereof.
Figure 12:
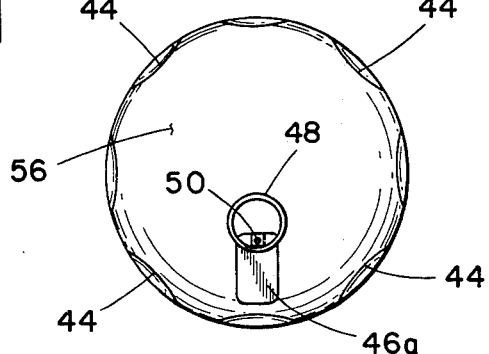
FIG. 12 is a top view of an oil filter showing a generally rectangular shaped tear strip and associated tab.
Figure 13:
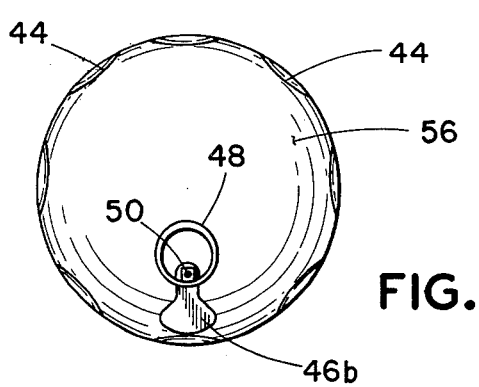
FIG. 13 is a top plan view of the oil filter of this invention showing a bell shaped tear strip and a tab attached to the narrow portion thereof; and, FIG. 14 is another top plan view of yet another embodiment of this invention showing a tear strip portion having a generally pie shaped contour.
Figure 14:
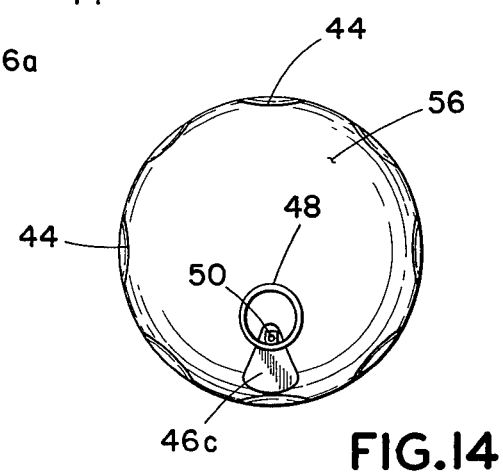

The pull tab and tear strip arrangement of this invention provides an oil filter with an opening to allow oil to be drained therefrom prior to removal of the filter. The tear strip preferred for use with this invention is designated by the numeral 46 and has a generally triangularly shaped outline with rounded corners. Several embodiments of this invention are possible such as ones providing a tear strip having a rectangular outline 46a (FIG. 12), a *bell shaped outline 46b* (FIGS. 8 and 13), or the outline of a pie segment shown in FIG. 14 and designated by the numeral 46c. Regardless of the outline of the tear strip which is utilized, a pull ring, tab, or other type of lifting member designated 48 must be provided to remove the tear strip from the surrounding metal and thereby provide a drainage opening in the oil filter. A circular ring 48 is contemplated which is large enough to be easily grasped by an adult finger. The pull ring or tab 48 also includes a short connecting portion extending from the tab to the adjacent tear strip 46 and which is fixedly attached to the tear strip with a mechanical fastener, such as a type of rivet, or perhaps through a metallurgical connection provided by a weld, dolder or other type of joint such as shown in U.S. Pat. Nos. 3,361,102 (1968), and 3,416,221 (1968). As shown in FIGS. 3 and 4, the pull tab 48 may be of a type which has filter engaging extensions which provide a mechanical advantage or multiplier so that as the edge of the pull tab 48 is lifted as shown in FIG. 4 a force multiplication is provided equal to the ratio of the combined length of both the long lever arm, which is distance P and L, divided by the length of the short lever arm, length P. Additionally, it may be desirable to provide a puncturing means adjacent the pull tab for use in initially piercing the oil filter thus initiating removal of the tear strip. Such a puncturing means is disclosed in U.S. Pat. No. 1,856,543 (1932) to G. L. Ericsson, which is incorporated herein by reference.

On the other hand, a pull tab 48 may be formed integrally with the tear strip 46 and applied as a subassembly by cold welding or any other appropriate process to an opening in the oil filter and then attached thereto. This type of pull tab is common with a number of devices used in the soft drink industry and could be used with this invention provided of course the pull tab could withstand the internal oil pressures without breaking. Such a pull tab and tear strip are disclosed in U.S. Pat. No. 2,946,478 to V. Clair, Jr., et al., entitled "Opening Means For Sealed Containers" which is hereby incorporated by reference.

When the oil filter of this invention is used on an engine the pull tab 48 is merely lifted from the surface of the oil filter in such a manner as to tear the pull tab away from the adjacent oil filter section and provide an opening through which oil contained within the oil filter may drain. The size of the opening must be large enough to overcome the flow resisting effects of both the surface tension of the oil and air pressure which could combine to retain oil within the filter if the opening provided is not large enough. Additionally, the scorings 47 which define the tear strip of the oil filter, must be deep enough to permit the lifting force provided by a person's finger in combination with any pull tab leverage or piercing, to overcome the shear strength of the oil filter metal thus allowing the tear strip section to tear away from the surrounding metal. On the other hand, the depth of the scoring must be shallow enough as to permit the oil filter to have resistance to oil pressure encountered during automobile operation which is generally in the area of 35 to 90 pounds per square inch, with an appropriate safety factor boosting the required strength of the oil filter to a maximum of 270 pounds per square inch pressure for conventional automobiles and up to 600 pounds per square inch for racing engines, also with appropriate safety factors.

This filter is used for purifying circulating fluid in an engine and includes a cylindrical housing enclosed at one end with a top 56 and having an attaching portion at the other end for threading the filter onto an associated engine mounted connector 32, and drainage means positioned on said oil filter and including a tear strip defined by an enclosed scored portion and also including a hand engageable tab portion positioned generally adjacent the oil filter and operatively connected with the tear strip whereby a force tending to lift the grasping portion from the oil filter will tear the tab from the filter thereby providing an opening for drainage of fluid from within the filter before the filter is removed from the engine.

Thus with the present invention it is noticed that an oil filter may be easily changed without the usual associated problems of oil dripping on the person changing the filter or dripping on the engine or dripping on the adjacent floor area. Simply by lifting the pull tab 48 with one hand and removing the attached tear strip 46 from the oil filter, oil may be drained prior to removal of the oil filter from an engine. The oil being drained may be directed into a hand held funnel, or other similar receiving member.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In combination with an engine having an oil pump and passages through the engine for the circulation of lubricating oil therethrough, inlet and outlet passage means for the introduction and removal of the lubricating oil from said engine, a filter housing having walls and mounting means for attaching said filter housing to the engine, said housing also having inlet and outlet means thereinto in fluid communication with said engine mounted inlet and outlet passage means, filter media within said housing located between said inlet and said outlet means of said housing, drainage means in one of said walls of said housing constructed and arranged for the drainage of oil therefrom, the improvement comprising said drainage means having a scored portion in one wall of said housing, said scored portion providing a weakened tear strip area capable of being broken to form a drainage opening through said one wall of said housing, tab means including means connected to said weakened tear strip area for separating said area from the housing along said scored portion whereby oil may be drained from said housing.

2. The combination of claim 1 wherein said walls comprise a cylindrical wall and an end wall wherein:
    said tear strip is formed in said end wall.

3. The combination of claim 1, wherein:
    said tear strip is located in the cylindrical wall.

4. The combination of claim 1, wherein said tab means comprises:
    a ring member having a finger opening and leverage means responsive to finger movement to provide said drainage opening in the filter housing.

5. The combination of claim 1, wherein said scored portion comprises:
    a plurality of angles comprising a triangle, and further, said tab means having means attached adjacent one of the angles of the triangle.

6. The combination of claim 1, wherein said tab means includes:
    pivoting extensions engageable with said filter housing when the tab portion is lifted to thereby provide a force multiplying lever for removing the weakened tear strip area.

* * * * *

UNITED STATES PATENT OFFICE
CERTIFICATE OF CORRECTION

PATENT NO. : 3,912,633
DATED : October 14, 1975
INVENTOR(S) : Arthur C. Delaney

It is certified that error appears in the above—identified patent and that said Letters Patent are hereby corrected as shown below:

Column 1, line 66, change "as" to --a--; column 4, line 9, change italic to non-italic; column 4, line 23, change "dolder" to --solder--.

Signed and Sealed this ninth Day of March 1976

[SEAL]

Attest:

RUTH C. MASON
*Attesting Officer*

C. MARSHALL DANN
*Commissioner of Patents and Trademarks*